United States Patent
Zhong et al.

(10) Patent No.: US 12,415,277 B2
(45) Date of Patent: Sep. 16, 2025

(54) ROBOT POSITIONING METHOD AND APPARATUS, INTELLIGENT ROBOT, AND STORAGE MEDIUM

(71) Applicant: ECOVACS COMMERCIAL ROBOTICS CO., LTD., Suzhou (CN)

(72) Inventors: Liyang Zhong, Suzhou (CN); Tong Li, Suzhou (CN); Changdong Shao, Suzhou (CN)

(73) Assignee: ECOVACS COMMERCIAL ROBOTICS CO., LTD., Suzhou (CN)

( * ) Notice: Subject to any disclaimer, the term of this patent is extended or adjusted under 35 U.S.C. 154(b) by 311 days.

(21) Appl. No.: 17/771,428

(22) PCT Filed: Sep. 14, 2020

(86) PCT No.: PCT/CN2020/115046
§ 371 (c)(1),
(2) Date: Apr. 22, 2022

(87) PCT Pub. No.: WO2021/077941
PCT Pub. Date: Apr. 29, 2021

(65) Prior Publication Data
US 2022/0362939 A1    Nov. 17, 2022

(30) Foreign Application Priority Data
Oct. 24, 2019   (CN) .............................. 201911017826

(51) Int. Cl.
*B25J 9/16*    (2006.01)
*G05D 1/00*    (2024.01)

(52) U.S. Cl.
CPC ........... *B25J 9/1697* (2013.01); *B25J 9/1653* (2013.01); *B25J 9/1664* (2013.01); *G05D 1/0248* (2013.01); *G05D 1/0274* (2013.01)

(58) Field of Classification Search
CPC ...... B25J 9/1653; B25J 9/1664; B25J 9/1697; G05D 1/0231; G05D 1/0246; G05D 1/0248; G05D 1/0274; G06V 10/82; G06V 20/35
See application file for complete search history.

(56) References Cited

U.S. PATENT DOCUMENTS

| | | |
|---|---|---|
| 10,055,805 B2 | 8/2018 | Satou |
| 10,345,822 B1 | 7/2019 | Parchami et al. |

(Continued)

FOREIGN PATENT DOCUMENTS

| | | |
|---|---|---|
| CN | 103278130 A | 9/2013 |
| CN | 103278170 A | 9/2013 |

(Continued)

OTHER PUBLICATIONS

EP Office Action dated Nov. 29, 2023 as received in Application No. 20879071.7.

(Continued)

*Primary Examiner* — Jason Holloway
*Assistant Examiner* — Blake A Wood
(74) *Attorney, Agent, or Firm* — Maschoff Brennan

(57) ABSTRACT

Provided are a robot positioning method and apparatus, an intelligent robot, and a storage medium. The method includes: configuring a camera and various sensors on a robot so that the robot may acquire an image collected by the camera and various sensing data collected by the various sensors (step 101); next extracting semantic information contained in the collected image (step 102) and identifying, according to the semantic information, a scenario where the robot is currently identified (step 103); finally, determining a current position of the robot according to target sensing data corresponding to the scenario where the robot is located (step 104). In the method, the sensing data used during (Continued)

determining the pose of the robot is not all the sensing data, but is the target sensing data corresponding to the scenario. Therefore, the basis for determining the pose is more targeted, thus further improving the accuracy of the pose.

8 Claims, 3 Drawing Sheets

(56) References Cited

U.S. PATENT DOCUMENTS

| | | | | |
|---|---|---|---|---|
| 2013/0259375 | A1* | 10/2013 | Dunlop | G06V 20/38 |
| | | | | 382/173 |
| 2017/0010618 | A1* | 1/2017 | Shashua | G01C 21/20 |
| 2018/0003511 | A1* | 1/2018 | Browning | G01C 21/3848 |
| 2019/0080470 | A1 | 3/2019 | Zhu et al. | |
| 2019/0278292 | A1 | 9/2019 | Levinson et al. | |
| 2020/0012292 | A1* | 1/2020 | Park | B25J 19/023 |
| 2020/0341473 | A1* | 10/2020 | Raag | G05D 1/0238 |

FOREIGN PATENT DOCUMENTS

| | | |
|---|---|---|
| CN | 103558856 A | 2/2014 |
| CN | 103712617 A | 4/2014 |
| CN | 103900583 A | 7/2014 |
| CN | 106272423 A | 1/2017 |
| CN | 106826809 A | 6/2017 |
| CN | 106840148 A | 6/2017 |
| CN | 107066507 A | 8/2017 |
| CN | 107144285 A | 9/2017 |
| CN | 107782304 A | 3/2018 |
| CN | 109682368 A | 4/2019 |
| CN | 109724603 A | 5/2019 |
| CN | 110220517 A | 9/2019 |
| CN | 110275540 A | 9/2019 |
| CN | 110319832 A | 10/2019 |
| CN | 110340877 A | 10/2019 |
| EP | 3508937 A1 | 7/2019 |
| EP | 3 660 618 A1 | 6/2020 |
| WO | 2018006082 A2 | 1/2018 |
| WO | 2018006082 A3 | 1/2018 |
| WO | 2019/185170 A1 | 10/2019 |

OTHER PUBLICATIONS

1 EP Office Action dated Apr. 5, 2024 as received in Application No. 20879071.7.

CN Office Action in Application No. 201911017826.8 dated Feb. 8, 2022.

CN Office Action in Application No. 201911017826.8 dated Sep. 9, 2021.

CN Office Action in Application No. 201911017826.8 Dated Jun. 29, 2022.

European Search Report in Application No. 20879071.7 Dated Oct. 18, 2022.

EPO Office Action dated Jul. 17, 2024 in application No. 20879071.7.

* cited by examiner

ROBOT POSITIONING METHOD AND APPARATUS, INTELLIGENT ROBOT, AND STORAGE MEDIUM

FIELD

The present disclosure relates to the technical field of artificial intelligence, in particular to a robot positioning method and apparatus, an intelligent robot, and a storage medium.

BACKGROUND

A robot is a kind of mechanical device that may accept human commands and perform corresponding work. With the development of an artificial intelligence technology, various intelligent robots have increasingly entered people's lives, such as a service robot, a cleaning robot, a self-moving vending robot, and the like.

An intelligent robot that may move freely is taken as an example. The intelligent robot will locate the intelligent robot according to data collected by its various sensors, and further plan a movement trajectory according to positioning results. The intelligent robot only needs to move along the trajectory to complete instructions of a user.

SUMMARY

Embodiments of the present disclosure provides a robot positioning method and device, and a storage medium, so as to improve the accuracy of positioning of an intelligent robot.

An embodiment of the present disclosure provides a robot positioning method. The method includes:
acquiring an image collected by a camera on a robot and various sensing data collected by various sensors on the robot;
extracting semantic information contained in the image;
recognizing, according to the semantic information, a scenario where the robot is located; and
determining a pose of the robot according to target sensing data, corresponding to the scenario, in the various sensing data.

An embodiment of the present disclosure provides a robot positioning apparatus, including:
an acquisition module configured to acquire an image collected by a camera on a robot and various sensing data collected by various sensors on the robot;
an extraction module configured to extract semantic information contained in the image;
a recognition module configured to recognize, according to the semantic information, a scenario where the robot is located; and
a pose determination module configured to determine a pose of the robot according to target sensing data, corresponding to the scenario, in the various sensing data.

An embodiment of the present disclosure provides an intelligent robot, including: a processor and a memory. The memory is configured to store one or more computer instructions which, when executed by the processor, implements:
acquiring an image collected by a camera on a robot and various sensing data collected by various sensors on the robot;
extracting semantic information contained in the image;
recognizing, according to the semantic information, a scenario where the robot is located; and
determining a pose of the robot according to target sensing data, corresponding to the scenario, in the various sensing data.

An embodiment of the present disclosure provides a computer-readable storage medium for storing a computer instruction which, when executed by one or more processors, causes the one or more processors to at least execute the following actions:
acquiring an image collected by a camera on a robot and various sensing data collected by various sensors on the robot;
extracting semantic information contained in the image;
recognizing, according to the semantic information, a scenario where the robot is located; and
determining a pose of the robot according to target sensing data, corresponding to the scenario, in the various sensing data.

In the embodiments of the present disclosure, the robot is equipped with a camera and various sensors. The robot may acquire an image collected by the camera and various sensing data collected by the various sensors. Then, the robot first extracts semantic information contained in the collected image and identifies, according to the semantic information, a scenario where the robot is currently identified. Finally, a current position of the robot is determined according to target sensing data corresponding to the scenario where the robot is located. It may be seen from the above description that the sensing data used during determining the pose of the robot is not all the sensing data, but is the target sensing data corresponding to the scenario. In this way, the basis for determining the pose is more targeted, thus further improving the accuracy of the pose.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are some embodiments of the present disclosure. Those ordinarily skilled in the art also may acquire other drawings according to the provided drawings without doing creative work.

DETAILED DESCRIPTION OF EXAMPLE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. Based on the embodiments in the present disclosure, all other embodiments obtained by those of ordinary skill in the art without doing creative work shall fall within the protection scope of the present disclosure.

The terms used in the embodiments of the present disclosure are only for the purpose of describing the specific embodiments, and are not intended to limit the present disclosure. As used in the embodiments of the present disclosure and the appended claims, the singular forms "a", "said" and "the" are intended to include the plural forms as well. Unless the context clearly indicates other meanings, "plurality" generally includes at least two.

Depending on the context, the words "if", "in case of" as used herein may be interpreted as "during" or "when" or "in response to determining" or "in response to detecting". Similarly, depending on the context, the phrases "if it is determined" or "if it is detected (the stated condition or event)" can be interpreted as "when it is determined" or "in response to determining" or "when it is detected (the stated condition or event)" or "in response to detecting (the stated condition or event)".

It should be further noted that the terms "comprise", "include", or any other variation thereof are intended to cover a non-exclusive inclusion, so that an article or system that includes a list of elements includes those elements and further includes other elements not expressly listed or further includes elements inherent to such an article or system. Without more constraints, an element preceded by "includes a . . . " does not preclude the existence of additional identical elements in the article or system that includes the element.

A human-computer interaction method provided herein will be described in detail below with reference to the following embodiments. Meanwhile, the sequence of steps in the following method embodiments is merely an example, rather than a strict limitation.

Figure 1:
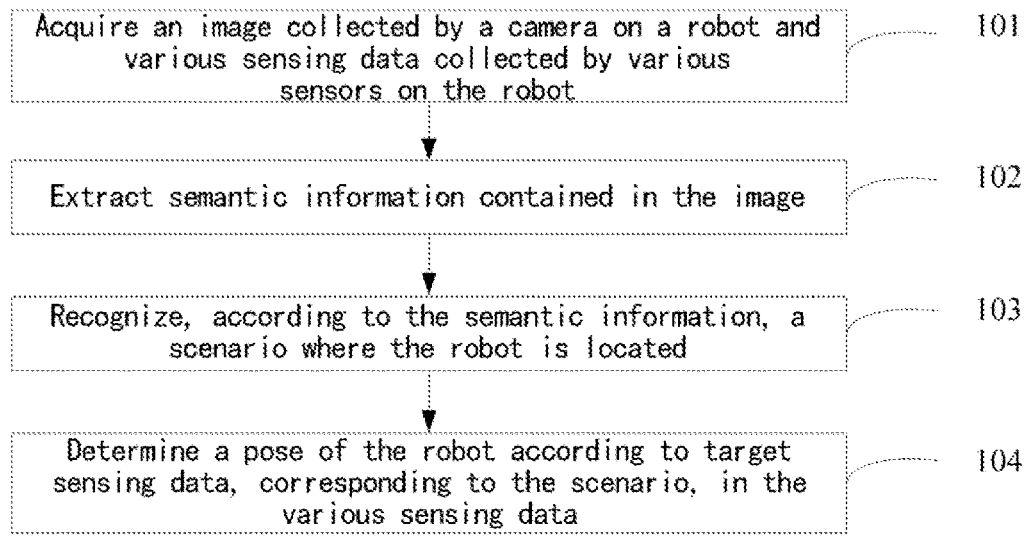
FIG. 1 is a flow chart of a robot positioning method provided in an embodiment of the present disclosure.

In practical applications, the robot positioning method may be performed by intelligent robots such as cleaning robots, welcoming robots, and self-moving vending robots. This kind of robot may move freely in a certain space to complete instructions issued by a user. FIG. 1 is a flow chart of a robot positioning method provided in an embodiment of the present disclosure. An execution main body of the method may be a robot. As shown in FIG. 1, the method may include the following steps:

101, an image collected by a camera on the robot and various sensing data collected by various sensors on the robot are acquired.

The camera on the robot is used for collecting an image corresponding to a scenario where the robot is located, and the various sensors on the robot are used for collecting various sensing data, so that the robot may obtain acquire the image and the various sensing data. The camera that collects images may also be considered as a visual sensor. Furthermore, the various sensors may include a laser sensor, a movement speed meter, a movement angle meter, and the like. Correspondingly, the laser sensor collects coordinates of a corresponding laser point when laser light is irradiated to an object. The movement speed meter collects a movement speed of the robot, and a movement distance of the robot may be further calculated according to this speed. The movement angle meter collects a movement angular speed of the robot, and a movement angle of the robot may be further calculated according to this angular speed. In practical applications, the above camera may be a monocular or binocular camera; the movement speed meter may be a wheel odometer; and the movement angle meter may be an inertial measurement unit (IMU).

At this time, the robot may be positioned in the following manner according to the acquired image and various sensing data. It is worth noting that since various sensors are provided at different positions on the body of the robot, the sensing data collected by each sensor corresponds to a coordinate system of the sensor itself. The inconsistency of the coordinate systems will obviously affect the subsequent positioning process. Therefore, in order to ensure the accuracy of the positioning of the robot, optionally, coordinate conversion may be performed for the various sensing data that have been acquired, that is, the sensing data in different coordinate systems are transferred to a target coordinate system. The target coordinate system may be a coordinate system corresponding to any sensor. Of course, in practical applications, the coordinate system corresponding to the laser sensor is usually determined as the target coordinate system. The transfer relationship between different coordinate systems has been pre-configured, and the robot may directly invoke it.

In addition to the unification of the coordinate systems, in practical applications, due to the different frequencies of data collection by different sensors, there is often a problem of inconsistent time stamps in the sensing data. In order to further ensure the accuracy of robot positioning, it is also necessary to perform time alignment on the various sensing data collected. Optionally, after the robot acquires the sensing data collected by the sensors, the robot immediately reads current system time of the robot, and determines the read system time as collection time of the sensing data. In the robot positioning process, the sensing data whose collection time is within a preset time difference is used.

102, semantic information contained in the image is extracted.

103, a scenario where the robot is located is determined according to the semantic information.

Then, the robot may perform semantic recognition on the image collected by the camera, so as to extract the semantic information contained in the image. In one optional mode, a pre-trained semantic recognition model may be configured in the robot, and the image captured by the camera will be directly input into the model, so that the model outputs a recognition result. Next, the robot may determine, according to the recognition result, the scenario where the robot is located. The above semantic recognition model may specifically be a Conditional Random Field (CRF) model, a Convolutional Neural Networks (CNN) model, a Recurrent Neural Networks (RNN) model, and the like.

For example, when the semantic information of the image includes pre-set types of buildings such as a large-area wall or glass, the robot may determine that the scenario where it is located is a corridor or a glass walkway. When the semantic information of the image includes multiple people, the robot may determine that the scenario where it is located is crowd. When the semantic information of the image neither includes the preset type of building nor includes the crowd, the robot may determine that it is located in a common positioning scenario. In practical applications, the robot is usually used in a public place. At this time, the common positioning scenario may be a lobby of the public place, such as the hall of a shopping mall, the hall of a bank, the hall of a hospital, and the like.

104. A pose of the robot is determined according to target sensing data, corresponding to the scenario, in the various sensing data.

Finally, a corresponding relationship between the scenario and the target sensing data may be pre-configured in the robot. The robot may determine, according to the correspondence relationship and the scenario where the robot is located, the target sensing data in the various sensing data and determine, according to the target sensing data, the pose of the robot.

For example, when the robot is in the crowd scenario, the robot may determine the pose of the robot according to the sensing data collected by the movement speed meter and the sensing data collected by the movement angle meter. When the robot is in the common positioning scenario, the robot may determine the pose of the robot according to the sensing data collected by the movement speed meter, the movement angle meter, the laser sensor, and the camera. For details on how to position the robot according to the target sensing data corresponding to the scenario in different scenarios, detailed descriptions in the following embodiments may be referred to.

In the embodiment provided by the present disclosure, the camera and the various sensors are configured on the robot, and the robot may acquire the image collected by the camera and the various sensing data collected by the various sensors. Then, the robot first extracts semantic information contained in the collected image and identifies, according to the semantic information, a scenario where the robot is currently identified. Finally, a current position of the robot is determined according to target sensing data corresponding to the scenario where the robot is located. It may be seen from the above description that the sensing data used during determining the pose of the robot is not all the sensing data, but is the target sensing data corresponding to the scenario. In this way, the basis for determining the pose is more targeted, thus further improving the accuracy of the pose.

In practical applications, the robot may still fail to move during the movement. At this time, the robot may continue to position itself in the manner provided by the above embodiment, and send a positioning result to a maintenance server. Maintenance personnel may find the robot on the basis of the positioning result and maintain it. Since the positioning result determined according to the above embodiment has high accuracy, the maintenance personnel may also quickly and accurately find the faulty robot, thereby improving the robot maintenance efficiency.

It has also been mentioned in the above description that robots with mobile capabilities are often used in public places, such as shopping malls, hospitals and so on. At this time, the robot may also provide a navigation service for a user while positioning its own pose, that is, the robot may lead the user to a target position where the user is going. The target position that the user wants to reach may be, for example, a certain store in the shopping mall or a certain clinic in the hospital, and the like.

Figure 2:
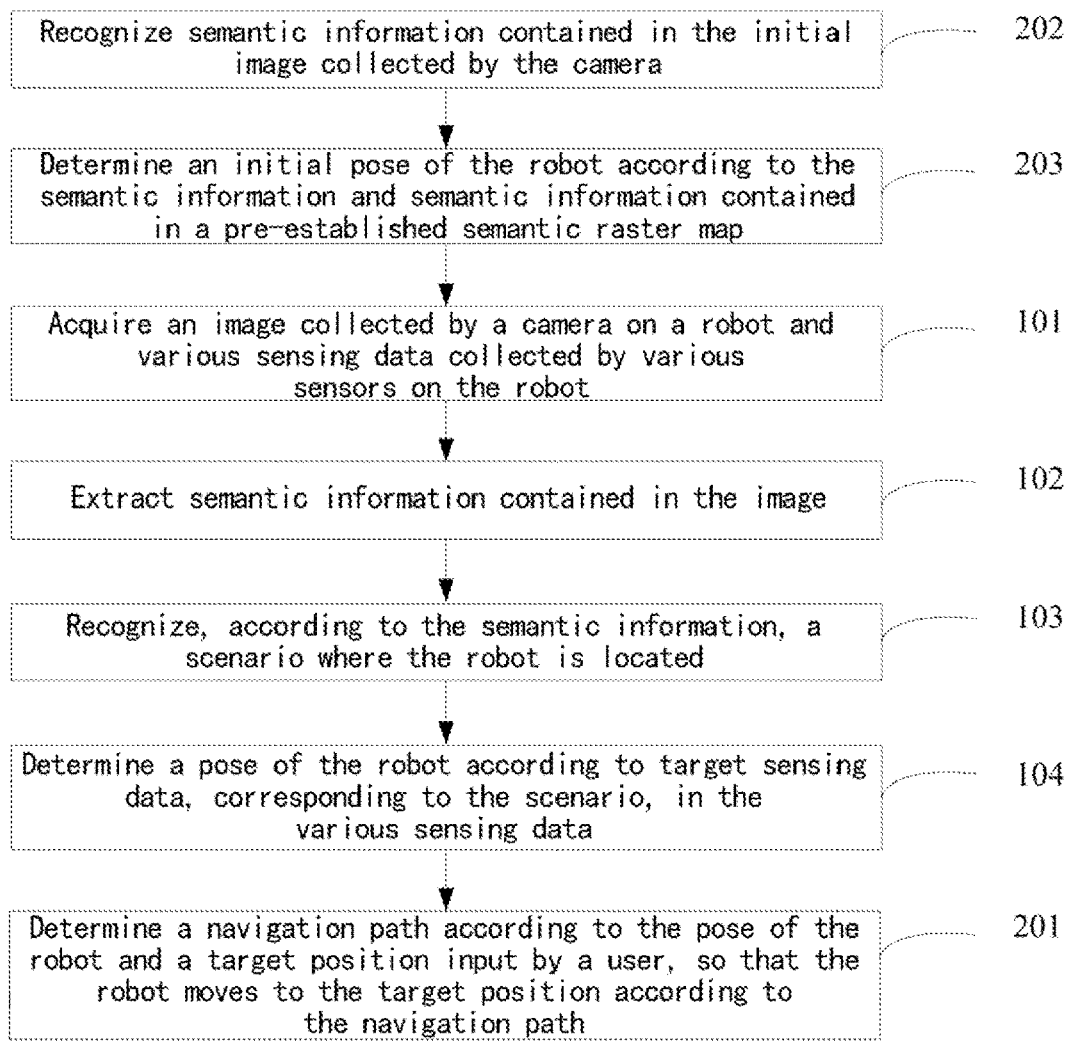
FIG. 2 is a flow chart of another robot positioning method provided in an embodiment of the present disclosure.

Based on the above description, on the basis of the embodiment shown in FIG. 1, FIG. 2 is a flow chart of another robot positioning method according to an embodiment of the present disclosure. As shown in FIG. 2, after above step 104, the method may further include the following steps:

201, a navigation path is determined according to the pose of the robot and the target position input by the user, so that the robot may move to the target position according to the navigation path.

The user may make the robot acquire the target position by interacting with the robot. Optionally, the robot may be configured with an operation screen for the user to input the target position, and at this time, the target position is represented in a textural form. In addition, a sound pickup device such as a microphone may also be mounted on the robot. When the user speaks out the target position, the robot may collect the target position in a phonetic form through the sound pickup device.

Then, the robot may plan a navigation path by taking the robot pose determined in step 104 as a start point and the target position input by the user as an end point. The robot simply moves along this navigation path to lead the user to the target location. Optionally, the pose of the robot and the target position input by the user may be marked in a pre-established raster map, and the robot may plan an optimal navigation path according to a positional relationship between the two positions in the raster map. Each raster in the raster map is marked with or without obstacles.

For the above raster map, its construction is a preprocessing process. Assuming that the robot provides positioning and navigation services in scenario A, the established raster map also corresponds to scenario A, and the map construction is completed before the robot starts to provide the positioning and navigation services in scenario A.

Optionally, the raster map may be constructed according to historical sensing data collected by a laser sensor configured in the robot. Specifically, before the robot provides the positioning and navigation services, the robot may move in previous scenario A in a manner of traversing the environment. At this time, a plane area where the scenario A is located has been pre-divided into several sub-areas, and each sub-area is referred to as one raster. As the robot moves, the laser sensor configured in the robot may collect sensing data which is the aforementioned historical sensing data. The robot then determines, according to the historical sensing data, which positions in scenario A has obstacles, and further calculates two-dimensional coordinates of the obstacles in the raster map. Finally, the raster map is established by marking each raster in the raster map according to the two-dimensional coordinates.

In addition, when being placed at one position in scenario A for the first time, the robot does not know its current pose. This pose may be referred to as an initial pose. Optionally, the robot may determine its initial pose in the following manner, and before above step 101, the method may further include the following steps:

202, semantic information contained in the initial image collected by the camera is recognized.

203, an initial pose of the robot is determined according to the semantic information and semantic information contained in a pre-established semantic raster map.

Specifically, the robot is placed in scenario A for the first time. Optionally, the robot may spin around, so that the camera may capture images corresponding to various directions. In order to distinguish the images from the image collected in step 101 of the foregoing embodiment, the images collected at this time may be referred to as initial images. The robot may then perform semantic recognition on each initial image. The specific semantic recognition process may refer to the relevant steps in step 102 in the embodiment shown in FIG. 1, which will not be repeated here. The semantic information contained in the initial image is then compared with the semantic information contained in the pre-established semantic raster map, so as to determine the initial pose of the robot. Each raster in the semantic raster map is marked with both whether there is an obstacle and a specific type of the obstacle.

For the semantic raster map, optionally, the establishment of this map is also a preprocessing process. The semantic raster map is established after the raster map is established and before the robot starts to provide the positioning and navigation services in scenario A. Assuming that the robot provides the positioning and navigation services in scenario A, the established semantic raster map also corresponds to scenario A.

The semantic raster map may be established on the basis of historical images collected by the camera and the established raster map. Specifically, the robot first generates the raster map according to the method disclosed in step 201, and during the movement of the robot in scenario A, the camera configured in the robot may collect several images. The several images may be referred to as the historical images. A semantic recognition model is used for identifying types of objects included in the historical images, and the recognized objects are marked in the raster map to establish the semantic raster map.

In this embodiment, after the robot determines its pose in the scenario, the robot may further provide the navigation service for the user according to the target position input by the user. Since the pose determined by the robot has high accuracy, the navigation service provided also has high accuracy, which improves the service level of the robot.

According to the embodiment shown in FIG. 1, the robot may determine, according to the semantic information of the image collected by the camera, the scenario where the robot is located. It may be seen that the accuracy of semantic information recognition of the image may directly affect the accuracy of scenario determination. In order to ensure the accuracy of semantic recognition, the brightness of the image may also be taken into account, that is, the object contained in the image and an environmental brightness value corresponding to the image are also considered during the semantic recognition. The environmental brightness value is used for indicating the illumination intensity of an image collection environment. If the illumination intensity is too small or too large, it will affect the semantic recognition of the image, and further lead to an inaccurate recognized scenario.

At this time, the robot may recognize, according to the environmental brightness value corresponding to the image and the object included in the image, the scenario where the robot is located. For the determination process of the environmental brightness value, according to an optional way, the robot first transforms the collected image into a grayscale image, and then determines, according to the grayscale value of each pixel point, the environmental brightness value corresponding to the image. For example, an average value of the grayscale values of all the pixel points may be calculated, and the average value may be determined as the environmental brightness value corresponding to the image.

Figure 3A:
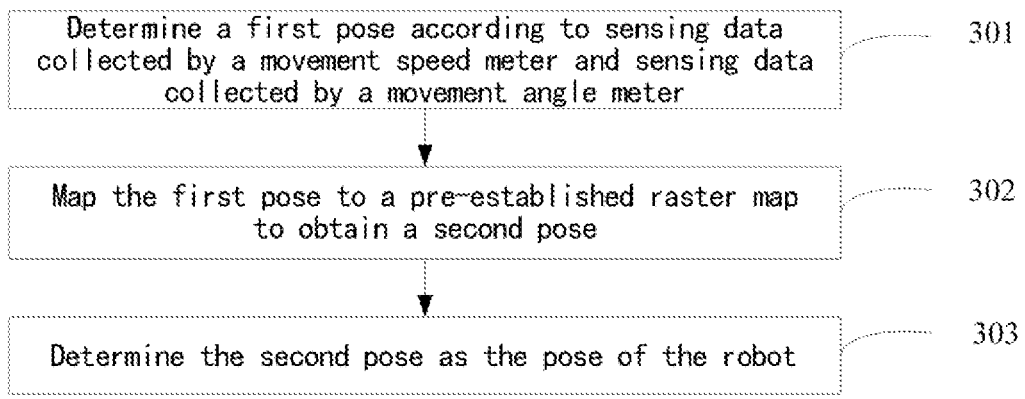
FIG. 3a is a flow chart of a robot pose determination method provided in an embodiment of the present disclosure.

If the calculated environmental brightness value corresponding to the image is not within a preset value range, it indicates that the current scenario where the robot is located has unsuitable illumination intensity, such as a scenario with too large or too small illumination intensity. For example, it may be a performance area with strong light in the shopping mall. In this case, as an optional implementation manner of step 104 in the embodiment shown in FIG. 1, as shown in FIG. 3*a*, the method may include the following steps:

301, a first pose is determined according to the sensing data collected by the movement speed meter and the sensing data collected by the movement angle meter.

302, the first pose is mapped to the pre-established raster map to obtain a second pose.

303, the second pose is determined as the pose of the robot.

Specifically, as mentioned in the above embodiments, the movement speed meter may be a wheel odometer, and the movement angle meter may be an Inertial Measurement Unit (IMU). Based on this, on the one hand, the robot may calculate a movement distance of the robot according to a rotational speed of left and right wheels of the robot collected by the wheel odometer, and on the other hand, the robot may calculate a movement angle of the robot according to an angular speed collected by the IMU. The first pose is then determined according to the calculated movement distance and movement angle and the pose of the robot at the last moment, and the first pose shows pose coordinates in the world coordinate system. The robot may then map the first pose to the pre-established raster map, that is, the first pose in the world coordinate system is transformed into a raster map coordinate system to obtain the second pose. The second pose is the pose of the robot at the current moment, that is, the positioning result of the robot. The raster map used in the above process may be established with reference to the relevant description in the embodiment shown in FIG. 2.

In this embodiment, when the scenario where the robot is located is a scenario with too large or too small illumination intensity, the robot positions the robot according to the sensing data collected by the movement speed meter and the movement angle meter and the raster map pre-established using the sensing data collected by the laser sensor, so that the basis for determining the pose is more targeted, thus improving the positioning accuracy.

Figure 3B:
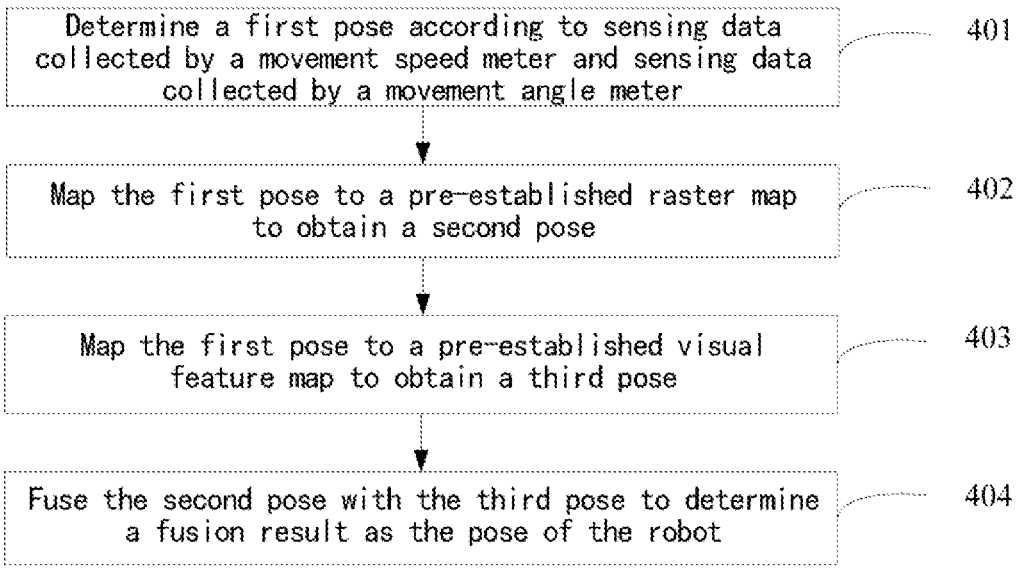
FIG. 3b is a flow chart of another robot pose determination method provided in an embodiment of the present disclosure.

If the robot calculates that the environmental brightness value corresponding to the image is within the preset value range, it indicates that the current scenario the robot is in is a scenario with suitable illumination intensity, such as an ordinary positioning scenario such as the hall of the shopping mall and the hall of the hospital. In this case, according to another optional implementation manner of step 104 in the foregoing embodiment, as shown in FIG. 3*b*, the method may include the following steps:

401, a first pose is determined according to the sensing data collected by the movement speed meter and the sensing data collected by the movement angle meter.

402, the first pose is mapped to the pre-established raster map to obtain a second pose.

The execution processes of foregoing steps 401 to 402 are similar to the corresponding steps in the foregoing embodiment and may refer to the relevant description in the embodiment shown in FIG. 3*a*, and details will not be repeated here.

403, the first pose is mapped to a pre-established visual feature map to obtain a third pose.

Each map point in the visual feature map corresponds to one pose coordinate in the world coordinate system. Since the first pose is also a coordinate in the world coordinate system, the coordinate of the first pose in the world coordinate system may be compared with the coordinate, in the world coordinate system, of each map point in the visual feature map; a map point closest to the position coordinates of the first pose is determined from the visual feature map as a target map point. The pose coordinates corresponding to the target map point represent the third pose. The above mapping process is actually a process of determining the target map point.

For the above-mentioned visual feature map, its construction is also a preprocessing process. Assuming that the robot provides positioning and navigation services in scenario A, the established visual feature map also corresponds to scenario A, and the map construction is completed before the robot starts to provide the positioning and navigation services in scenario A.

Optionally, the visual feature map may be constructed according to the images collected by the camera configured in the robot. Specifically, the robot may move at will in scenario A before it provides the positioning and navigation services, so that the camera configured on the robot may collect images. In order to distinguish the images from the image used in step 101, the images collected at this time may be referred to as historical images; sparse feature points are extracted from the collected historical images; and the visual feature map is established according to the extracted sparse feature points.

404, the second pose and the third pose are fused to determine a fusion result as the pose of the robot.

Finally, the robot may fuse the second pose with the third pose obtained after the mapping, and the fusion result is the positioning result of the robot. In an optional fusion method, different weight values may be set for the second pose and the third pose, respectively; weighted summation is performed on the second pose and the third pose; and a summation result is the fusion result. In another optional fusion method, an extended Kalman filtering method may also be used to fuse the second pose with the third pose to obtain the fusion result. This fusion method is a relatively mature technology, and this application will not describe the fusion process in detail.

In this embodiment, when the scenario where the robot is located is a scenario with suitable illumination intensity, the robot may position the robot according to the sensing data collected by the movement speed meter and the movement angle meter, the raster map pre-established using the sensing data collected by the laser sensor, and the visual feature map pre-established using the images collected by the camera. The basis for determining the pose is more targeted, thereby improving the accuracy of the pose.

Figure 3C:
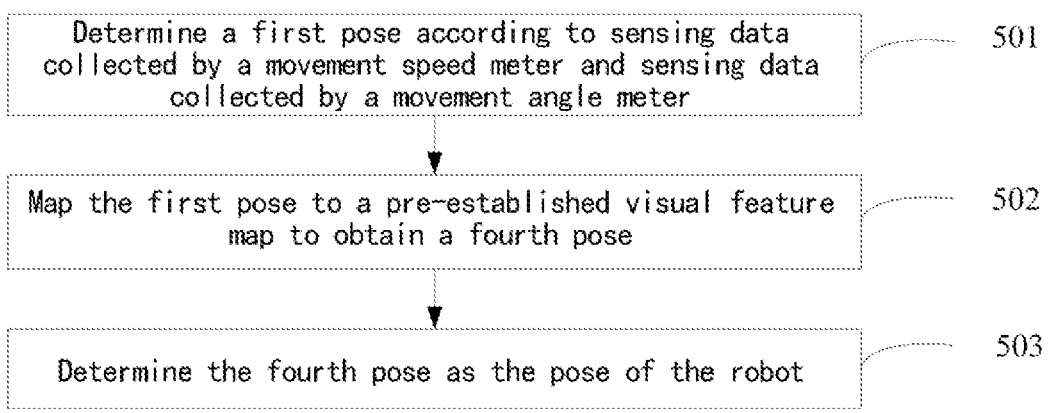
FIG. 3c is a flow chart of a still another robot pose determination method provided in an embodiment of the present disclosure.

In addition to the above scenarios, when the robot recognizes from the images collected by the camera that the images contain a building of a preset structure, such as a corridor and a glass walkway. At this point, the robot may be considered to be in a building of a preset structure. In this case, according to another optional implementation manner of step 104 in the above embodiment, as shown in FIG. 3c, the method may include the following steps:

501, a first pose is determined according to the sensing data collected by the movement speed meter and the sensing data collected by the movement angle meter.

502, the first pose is mapped to a pre-established visual feature map to obtain a fourth pose.

503, the fourth pose is determined as the pose of the robot.

The execution processes of foregoing steps 501 to 503 are similar to the corresponding steps in the foregoing embodiment and may refer to the relevant description in the embodiment shown in FIG. 3b, and details will not be repeated here.

It should be noted here that, on the one hand, the fourth pose obtained in this embodiment is actually the third pose in the embodiment shown in FIG. 3b, and the names are different only for distinguishing in different embodiments.

On the other hand, in this embodiment, the robot is located in the building of the preset structure, and the illumination intensity inside the building is also suitable. That is, the environmental brightness value corresponding to the image collected by the camera on the robot in this scenario is within the preset value range.

In this embodiment, when the robot is located in a building of the preset structure with the suitable illumination intensity, the robot may position the robot according to the sensing data collected by the movement speed meter and the movement angle meter, the raster map pre-established using the sensing data collected by the laser sensor, and the visual feature map pre-established using the images collected by the camera. The basis for determining the pose is more targeted, so as to improve the accuracy of the pose.

Figure 3D:
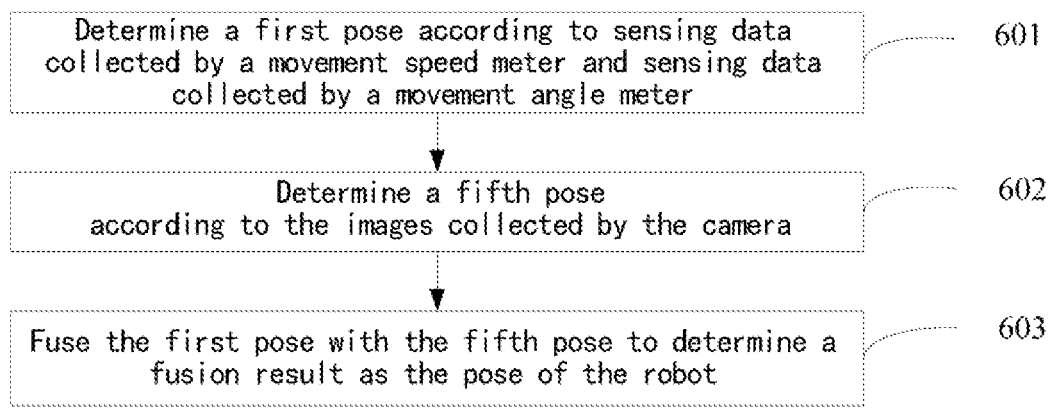
FIG. 3d is a flow chart of still another robot pose determination method provided in an embodiment of the present disclosure.

In addition, according to the descriptions in the above embodiments, it may be seen that the pre-established raster map, the semantic raster map and the visual feature map are all established when scenario A is in state I. For example, scenario A may be a shopping mall scenario, and state I represents a shelf placement manner in the shopping mall. For the shopping mall scenario, the arrangement of shelves often changes, so that the shopping mall is in state II which represents another shelf placement manner in the shopping mall. Based on the above description, when the robot determines, according to the images collected by the camera, that the robot is in scenario A in state II instead of scenario A in state I, the various pre-established maps corresponding to state I cannot be used. In this case, according to another optional implementation manner of step 104 in the above embodiment, as shown in FIG. 3d, the method may include the following steps:

601, a first pose is determined according to the sensing data collected by the movement speed meter and the sensing data collected by the movement angle meter.

The execution process of foregoing step 601 is similar to the corresponding steps in the foregoing embodiment and may refer to the relevant description in the embodiment shown in FIG. 3b, and details will not be repeated here.

602, a fifth pose is determined according to the images collected by the camera.

The camera on the robot may collect several images, and the robot may match two images with adjacent collection time from among these images. For convenience of description, the two images with adjacent collection time may be referred to as a first image and a second image, respectively. After matching, image points in the second image that are the same as all pixel points in the first image may be determined. The fifth pose is then determined according to pixel coordinates of the pixel points having the matching relationship in the first image and the second image respectively.

603, the first pose and the fifth pose are fused to determine a fusion result as the pose of the robot.

The execution process of foregoing step 603 is similar to the corresponding steps in the foregoing embodiment and may refer to the relevant description in the embodiment shown in FIG. 3b, and details will not be repeated here.

It should be noted that, in this embodiment, the robot is in scenario A in state II, and the illumination intensity in this scenario is also suitable, that is, the environmental brightness value corresponding to the images collected by the camera on the robot is within a preset value range.

In this embodiment, when the robot is in scenario A in state II, and the illumination intensity of scenario A in this state is suitable, the robot may position the robot according to the sensing data collected by the movement speed meter and the movement angle meter and the images collected by the camera. The basis for determining the pose is more targeted, thereby improving the accuracy of the pose.

Of course, in practical applications, scenario A in state II may also be a scenario with too large or too small illumination intensity. At this time, the robot may directly determine the pose of the robot according to the sensing data collected by the movement speed meter and the sensing data collected by the movement angle meter. The specific determination process of the pose may refer to the relevant description in the foregoing embodiments, and details will not be described herein.

When the robot recognizes, according to the image collected by the camera, that the image includes a crowd, it may be considered that the scenario where the robot is located is a crowded scenario. In this case, the robot may directly determine the pose of the robot according to the sensing data collected by the movement speed meter and the sensing data collected by the movement angle meter. The specific determination process of the pose may refer to the relevant description in the foregoing embodiments, and details will not be described herein.

A robot positioning apparatus of one or more embodiments of the present disclosure will be described in detail below. Those skilled in the art may understand that these human-computer interaction apparatuses may be configured by using commercially available hardware components through the steps taught in this solution.

Figure 4:
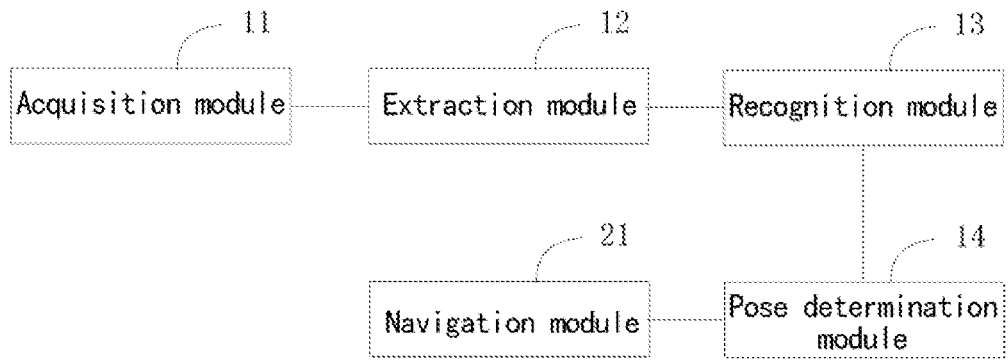
FIG. 4 is a schematic structural diagram of a robot positioning apparatus provided in an embodiment of the present disclosure.

FIG. 4 is a schematic structural diagram of a robot positioning apparatus provided in an embodiment of the present disclosure. As shown in FIG. 4, the apparatus includes:

an acquisition module 11 configured to acquire an image collected by a camera on a robot and various sensing data collected by various sensors on the robot;

an extraction module 12 configured to extract semantic information contained in the image;

a recognition module 13 configured to recognize, according to the semantic information, a scenario where the robot is located; and a pose determination module 14 configured to determine a pose of the robot according to target sensing data, corresponding to the scenario, in the various sensing data.

Optionally, the robot positioning apparatus may further include:

a navigation module 21 configured to determine, according to a pose of the robot and a target position input by a user, a navigation path so that the robot moves to the target position according to the navigation path.

In order to recognize the scenario where the robot is located, optionally, the recognition module 13 in the robot positioning apparatus is specifically configured to recognize according to an environmental brightness value corresponding to the image and/or an object contained in the image, the scenario where the robot is located.

Optionally, the environmental brightness value corresponding to the scenario is not within a preset value range.

The pose determination module 14 in the robot positioning apparatus is configured to:

determine a first pose according to sensing data collected by the movement speed meter and sensing data collected by the movement angle meter; map the first pose to a pre-established raster map to obtain a second pose, the raster map being established according to historical sensing data collected by a laser sensor; and determine the second pose as a pose of the robot.

Optionally, the environmental brightness value corresponding to the scenario is within a preset value range.

The pose determination module 14 in the robot positioning apparatus is specifically further configured to map the first pose to a pre-established visual feature map to obtain a third pose, the visual feature map being established according to historical images collected by the camera; and fuse the second pose with the third pose to determine a fusion result as a pose of the robot.

Optionally, the scenario corresponds to a building containing a preset structure in the image.

The pose determination module 14 in the robot positioning apparatus is specifically further configured to determine the first pose according to the sensing data collected by the movement speed meter and the sensing data collected by the movement angle meter; map the first pose to a pre-established visual feature map to obtain a fourth pose, the visual feature map being established according to historical images collected by the camera; and determine the fourth pose as a pose of the robot.

Optionally, the scenario corresponds to the image containing a crowd.

The pose determination module 14 in the robot positioning apparatus is specifically further configured to determine the pose of the robot according to the sensing data collected by the movement speed meter and the sensing data collected by the movement angle meter.

Optionally, the scenario where the robot is located is a scenario where a raster map cannot be used.

The pose determination module 14 in the robot positioning apparatus is specifically further configured to determine a first pose according to the sensing data collected by the movement speed meter and the sensing data collected by the movement angle meter; determine a fifth pose according to the images collected by the camera; and fuse the first pose with the fifth pose to determine a fusion result as a pose of the robot.

The robot positioning apparatus shown in FIG. 4 may implement the robot positioning method provided by the embodiment shown in FIG. 1 to FIG. 3d. The part not described in detail in this embodiment may refer to the relevant description of the embodiment shown in FIG. 1 to FIG. 3d, and will not be repeated here. The technical effects that may be achieved in this embodiment may also refer to the descriptions in the embodiments shown in FIG. 1 to FIG. 3d.

Figure 5:
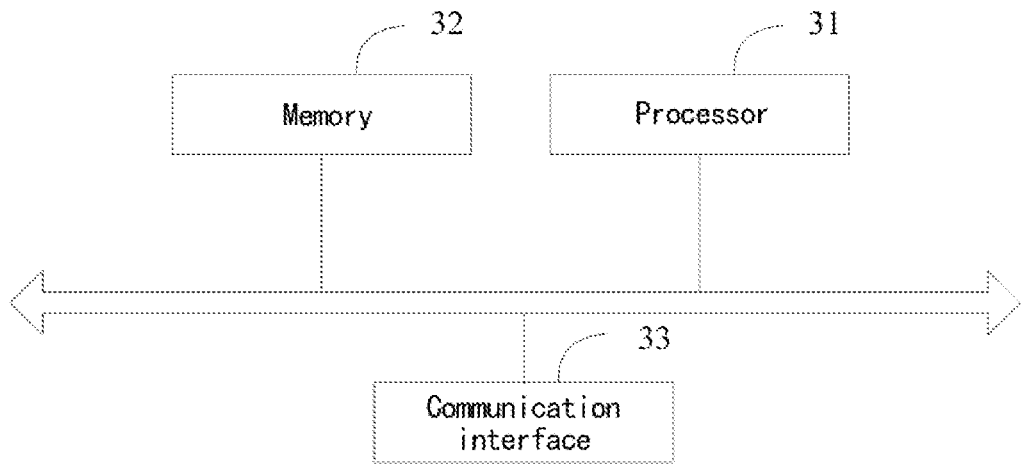
FIG. 5 is a schematic structural diagram of an intelligent robot corresponding to the robot positioning apparatus provided in the embodiment shown in FIG. 4.

The internal functions and structures of the robot positioning apparatus are described above. In a possible design, the structure of the robot positioning apparatus may be implemented as a part of the robot. As shown in FIG. 5, the intelligent robot may include a processor 31 and a memory 32. The memory 32 is configured to store a program that supports the intelligent robot to implement the robot positioning method provided in the embodiments shown in FIG. 1 to FIG. 3d, and the processor 31 is configured to execute the program stored in the memory 32.

The program includes one or more computer instructions, wherein when the one or more computer instructions are executed by the processor 31, the following steps may be implemented:

acquiring an image collected by a camera on a robot and various sensing data collected by various sensors on the robot;

extracting semantic information contained in the image;

recognizing, according to the semantic information, a scenario where the robot is located; and determining a pose of the robot according to target sensing data, corresponding to the scenario, in the various sensing data.

Optionally, the processor 31 is further configured to execute all or part of the steps in the embodiments shown in foregoing FIG. 1 to FIG. 3*d*.

The structure of the intelligent robot may further include a communication interface 33 used for communication with other devices or communication networks.

In addition, an embodiment of the present disclosure provides a computer-readable storage medium for storing a computer instruction which, when executed by one or more processors, causes the one or more processors to at least execute the following actions:

acquiring an image collected by a camera on a robot and various sensing data collected by various sensors on the robot;

extracting semantic information contained in the image;

recognizing, according to the semantic information, a scenario where the robot is located; and determining a pose of the robot according to target sensing data, corresponding to the scenario, in the various sensing data.

The apparatus embodiment described above is merely illustrative. The modules described as separate components may or may not be physically separated. Some or all of the modules may be selected according to actual needs to achieve the objectives of the solutions of the embodiments.

Through the descriptions of the above implementation modes, those skilled in the art may clearly understand that all the implementation modes may be implemented by means of a necessary general hardware platform, and of course, may also be achieved by combination of hardware and software. Based on this understanding, the above-mentioned technical solutions may be embodied in the form of computer products in essence or the parts that make contributions to the existing art.

For ease of understanding, the specific implementation of the robot positioning method provided above is exemplarily described in conjunction with the following application scenarios.

A public place such as a shopping mall is taken as an example. An intelligent terminal device such as a service robot may be installed in the hall of the shopping mall. The robot may walk at will in the mall, so that users in different locations in the mall may issue instructions to the robot. The users may issue a consultation instruction or a navigation request instruction to the robot.

When the robot walks at will in the mall, the camera on the robot will collect images in real time, and a movement speed meter and a movement angle meter on the robot may also collect sensing data in real time. For each collected image, the robot may perform semantic recognition on it to determine an object contained in the image, also determine an environmental brightness value corresponding to the image, and further determine, according to the object contained in the image and the environmental brightness value of the image, a scenario where the robot is located.

When it is recognized that the robot is in the hall of the shopping mall, the scenario is a scenario with suitable illumination intensity, that is, the environmental brightness value corresponding to the image in this scenario is within a preset value range. In this scenario, the robot will determine the first pose according to the sensing data collected by the movement speed meter and the movement angle meter, then map the first pose to a pre-established raster map and visual feature map respectively, so as to obtain a second pose and a third pose, respectively, finally fuse the second pose with the third pose, and determine a fusion result as a current pose of the robot. It is also positioning information of the robot. The raster map and the visual feature map both correspond to the shopping mall.

When it is recognized that the robot is in a crowded area in the mall, the robot may determine the current pose of the robot, that is, the positioning information, according to the sensing data collected by the movement speed meter and the movement angle meter.

According to the above description, when the robot is in different scenarios, the sensing data used for determining the current pose of the robot is targeted, so that the accuracy of positioning of the robot may be ensured. When a movement failure occurs during the movement of the robot, maintenance personnel may quickly find the robot according to the accurate positioning information, so as to repair the robot and ensure the robot maintenance efficiency.

In addition, the user may send a navigation request instruction to the robot in a textual form or a phonetic form, for example, "I want to go to store I". In response to this navigation request instruction, the robot may mark the location of store I in the raster map corresponding to the shopping mall. At the same time, the robot may also determine its current scenario on the basis of the images collected by the camera and the various sensing data.

If the robot is currently in the hall of the shopping mall, the robot may determine the current pose of the robot according to the sensing data collected by the movement speed meter and the movement angle meter and the pre-established raster map and visual feature map, and this pose may be marked on the raster map, so that the robot may plan a first navigation path for the robot according to this pose and a target position of store I. After that, the robot starts to move along this navigation path. During the movement along the first navigation path, the camera and various sensors on the robot will still collect images and sensing data in real time, and continuously determine, according to the collected images, the scenario where the robot is located.

If it is determined at a first moment that the robot has moved from the hall of the shopping mall to a corridor, the robot may determine the pose of the robot according to sensing data collected by the movement speed meter and an angular speed meter and the pre-established visual feature map. At this time, the robot may re-plan a second navigation path according to the pose of the robot at the first moment and the target position where store I is located, and the robot may continue to move along this second navigation path. If it is determined at a second moment that the robot has moved from the corridor to the crowded area in the shopping mall, the robot determines the pose of the robot according to the sensing data collected by the movement speed meter and the angular speed meter of the robot, and further continues to plan a third navigation path according to the pose at this time. According to the above process, the robot may continuously plan the navigation paths according to its current pose until the robot leads the user to the door of store I.

According to the above description, during the movement of the robot from the hall of the shopping mall to the door of store I, different data will be used to position the robot in real time in movement in different scenarios until the navigation is completed. Using the targeted data to position the robot may ensure the accuracy of positioning. Since the positioning information is the basis for planning the navigation paths, the accuracy of navigation is further ensured, and the quality of service of the robot is ensured.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they may still modify the technical solutions described in all the foregoing embodiments, or equivalently replace some or all of the technical features, and these modifications or replacements do not depart the essences of the corresponding technical solutions from the scope of the technical solutions of all the embodiments of the present disclosure.

What is claimed is:

1. A robot positioning method, comprising:
   acquiring an image collected by a camera on a robot and various sensing data collected by various sensors on the robot, wherein the various sensors comprise: a movement speed meter, a movement angle meter, and a laser sensor;
   processing the image to obtain an environmental brightness value corresponding to the image according to a grayscale value of each pixel point in the image;
   extracting semantic information contained in the image by using a pre-trained semantic recognition model provided in the robot, wherein the semantic information comprises an object contained in the image;
   recognizing, according to the semantic information, a scenario where the robot is located; and
   determining a pose of the robot according to target sensing data, corresponding to the scenario, in the various sensing data, and the environmental brightness value corresponding to the image;
   wherein, in response to the environmental brightness value corresponding to the scenario being not within a preset value range, the determining the pose of the robot according to target sensing data, corresponding to the scenario, in the various sensing data, and the environmental brightness value corresponding to the image comprises:
      determining a first pose according to the sensing data collected by the movement speed meter and the sensing data collected by the movement angle meter,
      mapping the first pose to a pre-established raster map to obtain a second pose, the raster map being established according to historical sensing data collected by the laser sensor, and
      determining the second pose as the pose of the robot; and
   wherein, in response to the environmental brightness value corresponding to the scenario being within the preset value range, the determining a pose of the robot according to target sensing data, corresponding to the scenario, in the various sensing data, and the environmental brightness value corresponding to the image comprises:
      mapping the first pose to a pre-established visual feature map to obtain a third pose, the visual feature map being established according to historical images collected by the camera, and the first pose being determined according to the sensing data collected by the movement speed meter and the sensing data collected by the movement angle meter; and
      fusing the second pose with the third pose to determine a fusion result as a pose of the robot, the second pose being determined according to the first pose and the raster map.

2. The method according to claim 1, further comprising:
   determining a navigation path according to the pose of the robot and a target position input by a user, so that the robot moves to the target position according to the navigation path.

3. The method according to claim 1, wherein the scenario corresponds to a building of a preset structure contained in the image;
   the determining a pose of the robot according to target sensing data, corresponding to the scenario, in the various sensing data, and the environmental brightness value corresponding to the image comprises:
      determining a first pose according to the sensing data collected by the movement speed meter and the sensing data collected by the movement angle meter;
      mapping the first pose to a pre-established visual feature map to obtain a fourth pose, the visual feature map being established according to historical images collected by the camera; and
      determining the fourth pose as a pose of the robot.

4. The method according to claim 1, wherein the scenario corresponds to a crowd contained in the image;
   the determining a pose of the robot according to target sensing data, corresponding to the scenario, in the various sensing data, and the environmental brightness value corresponding to the image comprises:
      determining a pose of the robot according to the sensing data collected by the movement speed meter and the sensing data collected by the movement angle meter.

5. The method according to claim 1, wherein the scenario where the robot is located is a scenario where the raster map may not be used;
   the determining a pose of the robot according to target sensing data, corresponding to the scenario, in the various sensing data, and the environmental brightness value corresponding to the image comprises:
      determining a first pose according to the sensing data collected by the movement speed meter and the sensing data collected by the movement angle meter;
      determining a fifth pose according to the images collected by the camera; and
      fusing the first pose with the fifth pose to determine a fusion result as a pose of the robot.

6. A robot positioning apparatus, comprising:
   an acquisition module configured to acquire an image collected by a camera on a robot and various sensing data collected by various sensors on the robot, wherein the various sensors comprise: a movement speed meter, a movement angle meter, and a laser sensor;
   an extraction module configured to process the image to obtain an environmental brightness value corresponding to the image according to a grayscale value of each pixel point in the image, and extract semantic information contained in the image by using a pre-trained semantic recognition model provided in the robot, wherein the semantic information comprises-an object contained in the image;
   a recognition module configured to recognize, according to the semantic information, a scenario where the robot is located; and
   a pose determination module configured to determine a pose of the robot according to target sensing data, corresponding to the scenario, in the various sensing data, and the environmental brightness value corresponding to the image;
wherein, in response to the environmental brightness value corresponding to the scenario being not within a preset value range, the pose determination module is further configured to:
  determine a first pose according to the sensing data collected by the movement speed meter and the sensing data collected by the movement angle meter;
  map the first pose to a pre-established raster map to obtain a second pose, the raster map being established according to historical sensing data collected by the laser sensor; and
  determine the second pose as a pose of the robot; and
wherein, in response to the environmental brightness value corresponding to the scenario being within the preset value range, the pose determination module is further configured to:
  map the first pose to a pre-established visual feature map to obtain a third pose, the visual feature map being established according to historical images collected by the camera, and the first pose being determined according to the sensing data collected by the movement speed meter and the sensing data collected by the movement angle meter; and
  fuse the second pose with the third pose to determine a fusion result as a pose of the robot, the second pose being determined according to the first pose and the raster map.

7. An intelligent robot, comprising a processor and a memory, wherein the memory is configured to store one or more computer instructions which, when executed by the processor, implements:
  acquire an image collected by a camera on a robot and various sensing data collected by various sensors on the robot, wherein the various sensors comprise: a movement speed meter, a movement angle meter, and a laser sensor;
  process the image to obtain an environmental brightness value corresponding to the image according to a grayscale value of each pixel point in the image;
  extract semantic information contained in the image by using a pre-trained semantic recognition model provided in the robot, wherein the semantic information comprises an object contained in the image;
  recognize, according to the semantic information, a scenario where the robot is located; and
  determine a pose of the robot according to target sensing data, corresponding to the scenario, in the various sensing data, and the environmental brightness value corresponding to the image;
  wherein, in response to the environmental brightness value corresponding to the scenario being not within a preset value range the determine the pose of the robot according to target sensing data, corresponding to the scenario, in the various sensing data, and the environmental brightness value corresponding to the image comprises:
    determining a first pose according to the sensing data collected by the movement speed meter and the sensing data collected by the movement angle meter;
    mapping the first pose to a pre-established raster map to obtain a second pose, the raster map being established according to historical sensing data collected by the laser sensor; and
    determining the second pose as a pose of the robot; and
  wherein, in response to the environmental brightness value corresponding to the scenario is within a preset value range;
    the determine the pose of the robot according to target sensing data, corresponding to the scenario, in the various sensing data, and the environmental brightness value corresponding to the image comprises:
    mapping the first pose to a pre-established visual feature map to obtain a third pose, the visual feature map being established according to historical images collected by the camera, and the first pose being determined according to the sensing data collected by the movement speed meter and the sensing data collected by the movement angle meter; and
    fusing the second pose with the third pose to determine a fusion result as the pose of the robot, the second pose being determined according to the first pose and the raster map.

8. A non-statutory computer-readable storage medium for storing a computer instruction which, when executed by one or more processors, causes the one or more processors to at least execute the following actions:
  acquiring an image collected by a camera on a robot and various sensing data collected by various sensors on the robot, wherein the various sensors comprise: a movement speed meter, a movement angle meter, and a laser sensor;
  processing the image to obtain an environmental brightness value corresponding to the image according to a grayscale value of each pixel point in the image;
  extracting semantic information contained in the image by using a pre-trained semantic recognition model provided in the robot, wherein the semantic information comprises an object contained in the image;
  recognizing, according to the semantic information, a scenario where the robot is located; and
  determining a pose of the robot according to target sensing data, corresponding to the scenario, in the various sensing data, and the environmental brightness value corresponding to the image;
  wherein, in response to the environmental brightness value corresponding to the scenario being not within a preset value range, the determining the pose of the robot according to target sensing data, corresponding to the scenario, in the various sensing data, and the environmental brightness value corresponding to the image comprises:
    determining a first pose according to the sensing data collected by the movement speed meter and the sensing data collected by the movement angle meter;
    mapping the first pose to a pre-established raster map to obtain a second pose, the raster map being established according to historical sensing data collected by the laser sensor; and
    determining the second pose as the pose of the robot; and
  wherein, in response to the environmental brightness value corresponding to the scenario being within a preset value range the determining the pose of the robot according to target sensing data, corresponding to the scenario, in the various sensing data, and the environmental brightness value corresponding to the image comprises:
    mapping the first pose to a pre-established visual feature map to obtain a third pose, the visual feature map being established according to historical images collected by the camera, and the first pose being determined according to the sensing data collected by the movement speed meter and the sensing data collected by the movement angle meter; and fusing the second pose with the third pose to determine a fusion result as the pose of the robot, the second pose being determined according to the first pose and the raster map.

\* \* \* \* \*